United States Patent Office 3,336,237
Patented Aug. 15, 1967

3,336,237
LUBRICATING OIL COMPOSITION
Bobby Malone, East Alton, and Julian G. Ryan, Wood River, Ill., assignors to Shell Oil Company, New York, N.Y., a corporation of Delaware
No Drawing. Filed May 16, 1963, Ser. No. 281,022
7 Claims. (Cl. 252—32.5)

This invention relates to a non-ash forming lubricating oil composition which is resistant to viscosity changes over wide temperature ranges and which is also wear and corrosion resistant.

Non-ash forming polymeric detergents have become increasingly popular as lubricating oil additives because of their tendency not to form ash. However, these materials lack wear inhibiting properties and addition of conventional wear inhibitors such as sulfurized or sulfurized-phosphorized hydrocarbons or fatty materials has not been successful particularly due to their tendency to adversely effect the viscosity stability of the oil composition and their inability to function effectively as extreme pressure agents when in combination with polymeric detergents.

It has now been discovered that the addition of a small amount of from about 0.01% to about 2% of an oil-soluble long-chain alkyl amine salt of a diaryl acid phosphate to a mineral lubricating oil composition containing from about 1% to about 10% of a certain polymeric nitrogen-containing detergent results in lubricating oil compositions having excellent viscosity stability as well as detergent, wear and corrosion resistant properties.

By certain polymeric nitrogen-containing detergents is meant oil-soluble copolymers of vinyl pyridine and acrylate ester mixtures. Specifically these copolymers are made by polymerizing vinyl pyridine and a mixture of at least two dissimilar acrylates of different long-chain alcohols and also an acrylate of a $C_{1-4}$ alcohol, total acrylic ester being in a mol ratio varying from 1:10 to 2:1, the acrylate of the lower aliphatic alcohol making up not more than 60 mol percent of the total ester, and the molecular weight of the copolymer varying from $5 \times 10^4$ to $2.5 \times 10^6$, as determined by the light scattering method. Copolymers of this type are fully described in U.S. Patent 2,839,512 and include copolymers of vinyl pyridine compounds such as 2-methyl-5-vinyl pyridine, 2-ethyl-5-vinyl pyridine, 4-methyl-2-vinyl pyridine, 2-butyl-5-vinyl pyridine, 3-vinyl pyridine and methacrylate esters such as lauryl and/or stearyl methacrylates in the molecular weight range of from 100,000 to 650,000. Examples of such copolymers include (I) copolymer of 2-methyl-5-vinyl pyridine and lauryl methacrylate (MW 450,000), (II) copolymers of 2-methyl-5-vinyl pyridine and stearyl methacrylate (MW 500,000), (III) copolymers of 2-methyl-5-vinyl pyridine and 50–50 mixture of lauryl and stearyl methacrylates (MW 650,000). Still other copolymers are shown in Table I.

TABLE I

| Example | SMA | LMA | MMA | BMA | MVP |
|---|---|---|---|---|---|
| IV | 2.24 | 4.48 | 1.86 | | 1 |
| V | 2.24 | 4.48 | | 1.86 | 1 |
| VI | 2.05 | 3.92 | 2.43 | | 1 |
| VII | 2.05 | 3.92 | | 2.43 | 1 |
| VIII | 1.68 | 3.36 | 3.36 | | 1 |
| IX | 1.68 | 3.36 | | 3.36 | 1 |
| X | 1.40 | 2.80 | 4.2 | | 1 |

NOTE.—SMA=stearyl methacrylate; LMA=lauryl methacrylate; MMA=methyl methacrylate; BMA=butyl methacrylate; MVP=2-methyl-5-vinyl pyridine.

The viscosity improver includes long-chain alkyl amine salts of diaryl acid phosphates. The long-chain alkyl-amines used to form the phosphate salt include oil-soluble non-aromatic amines or polyamines and include oil-soluble long-chain primary, secondary or tertiary saturated aliphatic or cycloaliphatic mono or polyamines having at least one alkyl radical of from 12 to 30 carbon atoms in the molecule. Aliphatic monoamines of this type include mono-, di-, or tri-dodecyl, tetradecyl, hexadecyl or octadecyl monoamines. In the secondary and tertiary amines the alkyl radicals can be the same or different. Aliphatic polyamines include alkyl substituted alkylene polyamines wherein the alkylene radical is from 2 to 10 carbon atoms such as ethylene diamine, propylene diamine, butylene diamine, diethylene tetraamine, tetraethylene pentamine and the alkyl substitutent or substituent group(s) can be attached to the same or different nitrogen atoms in the molecule and should generally have from 12 to 18 carbon atoms. Such alkyl substituted alkylene polyamines include N—$C_{12-18}$ alkyl propylene diamine, N-lauryl propylene diamine and the like. Especially useful are the amines which are commercially available from Armour Chemical Company under the trade name of "Armeens" such as "Armeen 18" which is a mixture of primary amines predominantly in octadecylamine or "Armeen DM 18" (dimethyloctadecylamine) or "Duomeen" ($C_{12}$—NH—$C_3H_6$—$NH_2$).

The diaryl acid phosphate used to form the salts include diphenyl acid phosphate, ditolyl acid phosphate, dicresyl acid phosphate and the like and illustrative examples of the salts are: diaryl acid phosphate salt of mono- and polyamines having at least one alkyl radical of 12 or more carbon atoms, e.g. dilauryl amine ditolyl phosphate, octadecylamine dicresyl phosphate, dimethyl octadecylamine dicresyl phosphate, dilaurylamine diphenyl phosphate, N-lauryl propylene diamine dicresyl phosphate, octylated-styrenated diphenylamine dicresyl phosphate, octylated-styrenated diphenylamine ditolyl phosphate, dimethyl hexadecyl amine ditolyl phosphate and mixtures thereof.

When desired, additional improvements with respect to oxidation stability and scuffing inhibition can be imparted to the oil compositions containing the polymer salts of this invention by incorporating small amount (0.01%–2%, preferably 0.01%–1%) of phenolic antioxidants such as alkylphenols, e.g. 2,6-ditert.butyl-4-methylphenol or p,p'-methylene bisphenols such as 4,4'-methylene bis(2,6-di-tert.butylphenol) or arylamines such as phenyl-alpha-naphthylamine; dialkyl sulfides and mixtures thereof, e.g. dibenzyl disulfide, didodecyl sulfide. Antiscuffing agents include full organic phosphites, phosphates, phosphonates and their thio-derivatives such as $C_{3-18}$ trialkyl phosphites, or phosphonates, e.g. tributyl, trioctyl, trilauryl, tristearyl, tricyclohexyl, tribenzyl, tricresyl, triphenyl phosphites or phosphates, as well as their thio-derivatives, $P_2S_5$-terpene reaction product, phosphonates such as dibutyl methane phosphate, dibutyl trichloromethanephosphonate, dibutyl monochloromethanephosphonate, dibutyl chlorobenzenephosphonate, and the like. The full esters of pentavalent phosphorus acids such as triphenyl, tricresyl, trilauryl and tristearyl orthophosphates or potassium salt of $P_2S_5$-terpene reaction product are preferred.

The mineral lubricating oils used in compositions of this invention can be obtained from any paraffinic, naphthenic, asphaltic or mixed base crude, and/or mixtures thereof. The viscosity of these oils may vary over a wide range, such as from 100 SUS at 100° F. to 100 SUS at 210° F. The hydrocarbon oils may be blended with fixed oils such as castor oil, lard oil and the like and/or with synthetic lubricants such as polymerized olefins, copolymers of alkylene glycols and the alkylene oxides, silicone polymers, e.g. dimethyl silicone polymers and the like.

Mineral lubricating oils which are particularly desirable for use in compositions of the invention can be obtained from West Texas Ellenburger crudes, East Texas crudes, Oklahoma crudes, California crudes. A useful solvent refined East Texas mineral lubricating oil had the following properties:

Pour point, ° F. _____ +10
Viscosity centistokes at 100° F. _____ 27
Viscosity index _____ 95

Illustrative compositions of the present invention are as follows:

Composition A: Percent wt.
    Copolymer Ex. IV _____ 5
    Dilaurylamine ditolyl phosphate _____ 0.04
    Mineral lubricating oil _____ Balance Composition B:
    Copolymer Ex. V _____ 5
    Dimethylhexadecylamine ditolyl phosphate __ 0.04
    Mineral lubricating oil _____ Balance Composition C:
    Copolymer Ex. II _____ 5
    Dimethyl hexadecylamine dicresyl phosphate __ 0.2
    Tritolyphosphate _____ 0.8
    Mineral lubricating oil _____ Balance Composition D:
    Copolymer of V _____ 5.5
    Octadecylamine ditolyl phosphate _____ 0.04
    Tritolyl phosphate _____ 0.8
    Mineral lubricating oil _____ Balance Composition E:
    Copolymer Ex. II _____ 5
    Dilaurylamine ditolyl phosphate _____ 0.08
    1,1 - bis(3.5 - ditert.butyl - 4 - hydroxyphenyl) methane _____ 0.5
    Tritolyl phosphate _____ 0.8
    Mineral lubricating oil _____ Balance Compositions A–E tested in the 8-hour Chevrolet test showed essentially no sign of viscosity or viscosity index change at the end of the test, whereas omitting the amine diaryl phosphates salts from Compositions A–E and subjecting such modified compositions (A'–E') to the same, resulted in 10–30% decrease in viscosity and viscosity index Compositions A–E also pass Oldsmobile Scuffing Test described in the ASTM report of Oct. 6, 1959, entitled "Engine Test Sequence for Evaluationg Oils for API Service" with ratings of 8.5–9.5 (10=perfect) whereas Compositions A'–E' rate between 4 and 5 with base mineral lubricating oil rated at 4. Also, compositions pass the GM–MS Test Sequences I–III (1960) with ratings of 85–95 (100=perfect) whereas omitting the amine diaryl phosphate salts results in failure.

Lubricating compositions of this invention are useful in engines operating at high temperature, high speed and extreme pressures, as well as in various other types of industrial equipment.

We claim as our invention:

1. A lubricating oil composition comprising a major amount of mineral lubricating oil and from about 1% to about 10% of an oil-soluble copolymer of 2-methyl-5-vinyl pyridine and a mixture of lauryl and stearyl methacrylates the mole ratio of the pyridine compound to the methacrylate mixture being from 1:10 to 2:1 respectively and said copolymer having a molecular weight range of from 100,000 to 650,000 and from about 0.01% to about 2% of a phosphate selected from the group consisting of the dilaurylamine salt of dicresyl acid phosphate, the dilaurylamine salt of ditolyl acid phosphate and the dimethyl hexadecylamine salt of ditolyl acid phosphate.

2. The composition of claim 1 containing 0.05–1% each of tritolyl phosphate and 1,1-bis(3,5-ditert butyl-4-hydroxy phenyl)methane.

3. The composition of claim 1 wherein the phosphate is the dilaurylamine salt of dicresyl acid phosphate.

4. A lubricating oil composition comprising a major amount of mineral lubricating oil and from about 1% to about 10% of an oil-soluble copolymer of 2-methyl-5-vinyl pyridine and a mixture of lauryl and stearyl methacrylates the mole ratio of the pyridine compound to the methacrylate mixture being from 1:10 to 2:1 respectively and said copolymer having a molecular weight range of from 100,000 to 650,000 and from about 0.01% to about 2% of the dilaurylamine salt of ditolyl acid phosphate.

5. The composition of claim 4 containing 0.05–1% each of tritolyl phosphate and 1,1-bis(3,5-ditert.butyl-4-hydroxyphenyl)methane.

6. A lubricating oil composition comprising a major amount of mineral lubricating oil and from about 1% to about 10% of an oil-soluble copolymer of 2-methyl-5-vinyl pyridine and a mixture of lauryl and stearyl methacrylates the mole ratio of the pyridine compound to the methacrylate mixture being from 1:10 to 2:1 respectively and said copolymer having a molecular weight range of from 100,000 to 650,000 and from about 0.01% to about 2% of dimethyl hexadecylamine salt of ditolyl acid phosphate.

7. The composition of claim 6 containing 0.05–1% each of tritolyl phosphate and 1,1-bis(3,5-ditert.butyl-4-hydroxy phenyl)methane.

References Cited

UNITED STATES PATENTS

| | | | |
|---|---|---|---|
| 2,285,853 | 6/1942 | Downing et al. | 252—32.5 |
| 2,403,764 | 7/1946 | Smith et al. | 252—32.5 |
| 2,839,512 | 6/1958 | Barnum et al. | 252—51.5 |
| 3,052,630 | 9/1962 | Anderson | 252—51.5 |
| 3,116,248 | 12/1963 | Frew | 252—32.5 |
| 3,116,249 | 12/1963 | Ratner et al. | 252—32.5 |

FOREIGN PATENTS 799,037    7/1958    Great Britain.

DANIEL E. WYMAN, *Primary Examiner.*

J. R. McBRIDE, P. P. GARVIN, *Assistant Examiners.*